A. BLANCHARD.
PLOW OR ANALOGOUS FARM MACHINE FOR ENABLING IT TO BE OPERATED BY MOTOR.
APPLICATION FILED FEB. 8, 1918.

1,298,870.  Patented Apr. 1, 1919.

Inventor:-
Adolphe Blanchard,
By:- B. Singer, Atty.

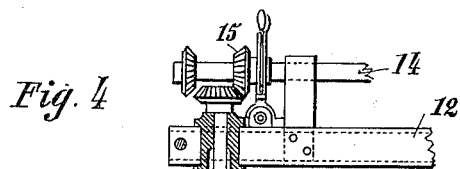
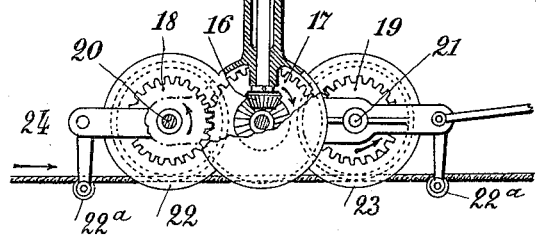
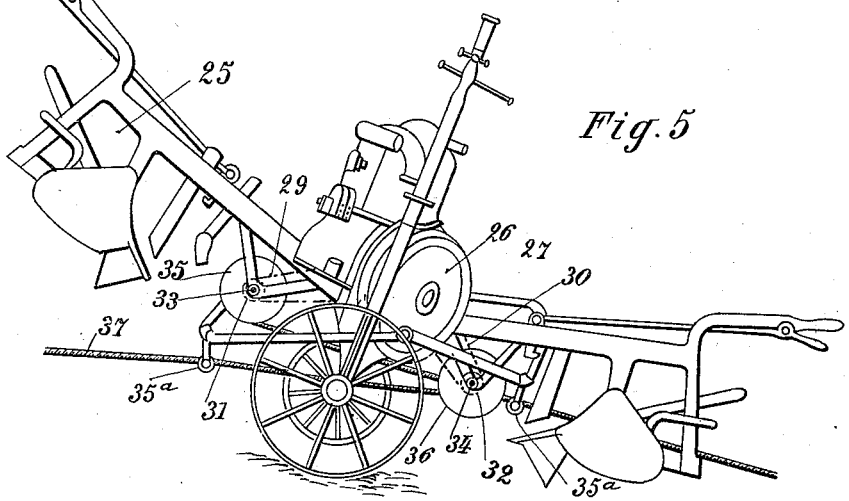
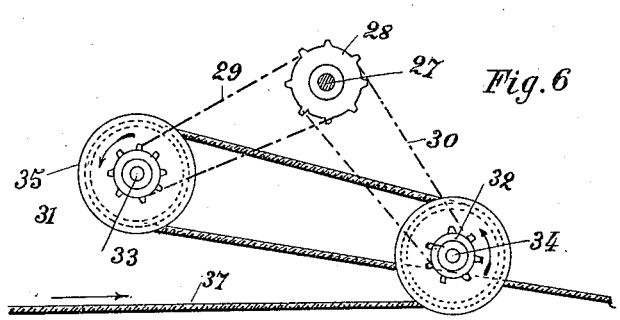

A. BLANCHARD.
PLOW OR ANALOGOUS FARM MACHINE FOR ENABLING IT TO BE OPERATED BY MOTOR.
APPLICATION FILED FEB. 8, 1918.

1,298,870.

Patented Apr. 1, 1919.
3 SHEETS—SHEET 3.

Inventor:-
Adolphe Blanchard,
By:- B. Singer, Atty.

UNITED STATES PATENT OFFICE.

ADOLPHE BLANCHARD, OF VARENNES, FRANCE.

PLOW OR ANALOGOUS FARM-MACHINE FOR ENABLING IT TO BE OPERATED BY MOTOR.

1,298,870. Specification of Letters Patent. Patented Apr. 1, 1919.

Application filed February 8, 1918. Serial No. 216,056.

*To all whom it may concern:*

Be it known that I, ADOLPHE BLANCHARD, residing at Varennes, in the commune of Jablines, France, have invented new and useful Improvements in or Relating to Plows or Analogous Farm-Machines for Enabling Them to be Operated by Motor, of which the following is a specification.

This invention relates to improvements in plows or analogous farm machines, by which they may be provided with a motor and operated thereby.

The object of the invention is to replace animal power for operating farming machinery by light explosion motors.

According to one form of this invention an explosion motor combined with a plow, say, of Belgian or swing type, operates a kind of windlass which causes traction upon the Belgian or swing plow by means of a cable fastened down at both sides of the field, this combination permitting of the obtention of an artificial adhesion on all classes of land in place of that usually obtained due to the considerable weight of the machines, whether of heavy type, or otherwise.

In the accompanying drawings, which represent some constructional forms of the invention by way of example:

Fig. 4 shows a detail of Fig. 3;

Fig. 5 is a perspective view of a light swing plow fitted with a motor;

Fig. 6 shows a detail of Fig. 5;

Figure 1:
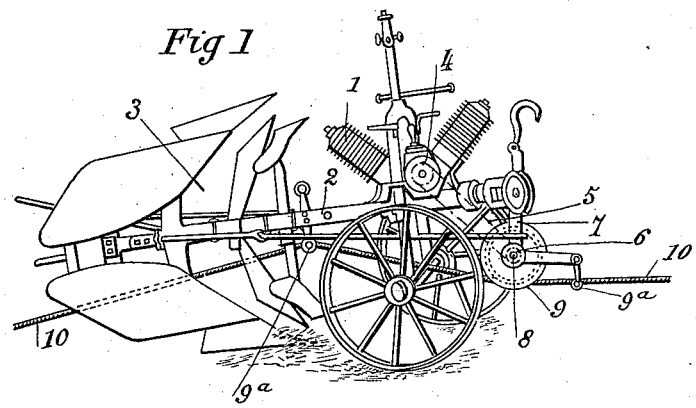
Figure 1 is a perspective view of an ordinary Belgian plow fitted with a light explosion motor.
Figure 2:
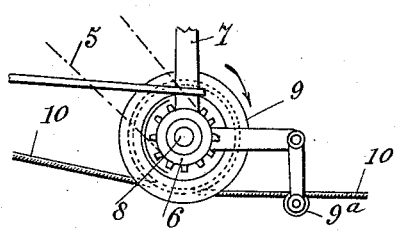
Fig. 2 shows a detail of Fig. 1.

In the constructional form, according to Figs. 1 and 2, a light motor 1, for instance, a motor cycle engine, is fixed on the frame work 2 of an ordinary Belgian plow 3.

To the shaft of the motor, there is keyed a chain or sprocket wheel 4, which, by the aid of a chain 5, drives a second chain wheel 6.

The chain wheel 6 turns in a fork 7 attached to the front portion of the framework 2. To the axle 8 of the chain wheel 6 is fixed a winch pulley 9 which creates pressure of the cable 10 on the wheel 6 and thereby causes traction of the plow thereon. A small wheel 9ª serves to guide the cable and consequently to maintain the direction in which the plow is running.

Figure 3:
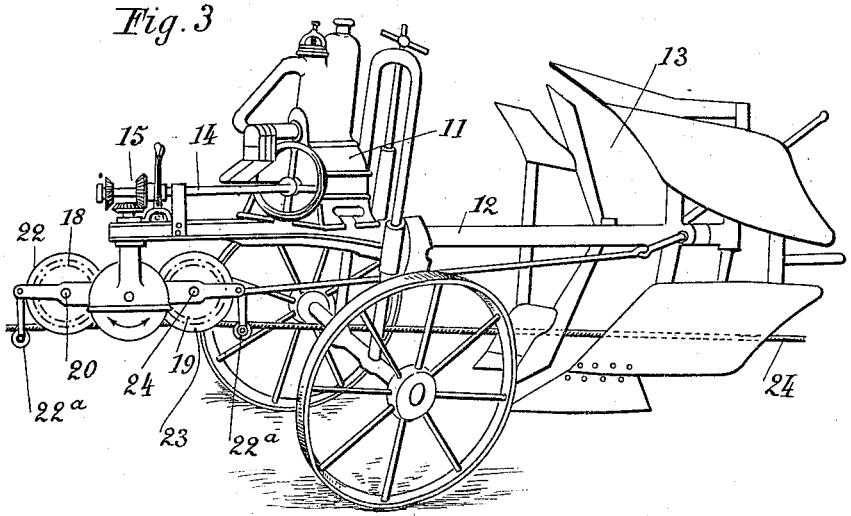
Fig. 3 is a perspective view of a Belgian plow fitted with a water cooled motor.

In the constructional form shown in Figs. 3 and 4, a water cooled motor 11 is mounted upon the framework 12 of a Belgian plow 13. By means of the two bevel gearings 15 and 16 the shaft 14 of the motor operates a toothed wheel 17 which gears with two other toothed wheels 18 and 19. These latter are fixed upon the axles 20 and 21 provided with two pulleys 22 and 23 that cause traction of the plow along the cable 24.

The gearing 15 serves to change the speed and to throw the plow out of gear at the end of the furrows. Two small wheels 22ª serve as guides for the cable. The gears, the toothed wheels and the pulleys are mounted on a carrier attached to the framing bars 12.

In the constructional form shown in Figs. 5 and 6, a swing plow is provided with a motor 26. To the shaft 27 of this motor there is fixed a chain wheel 28, which, by means of two chains 29 and 30, operates two other chain wheels 31 and 32 keyed upon the axles 33 and 34 which carry two winch pulleys 35 and 36, these winches causing traction of the plow along the cable 37 which passes over the small wheels 35ª.

Figure 7:
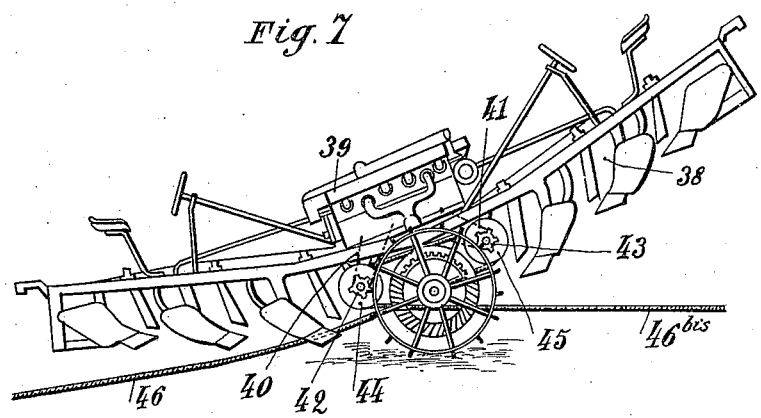
Fig. 7 is a perspective view of a heavy swing plow fitted with a motor.

In the constructional form shown in Fig. 7 a heavy swing plow 38 is provided with a motor 39 which, by means of the chains 40 and 41 operates two chain wheels 42 and 43 mounted on the axles which carry the pulleys 44 and 45. These winches haul the plow by means of two cables 46 and 46¹, one cable being unwound and the other wound up. In this constructional form the swing plow having a fore- or motor connection for direct traction and both driving and steering wheels, can, after plowing is finished, be changed into a motor lorry for the heavy and rough farm work.

Figure 8:
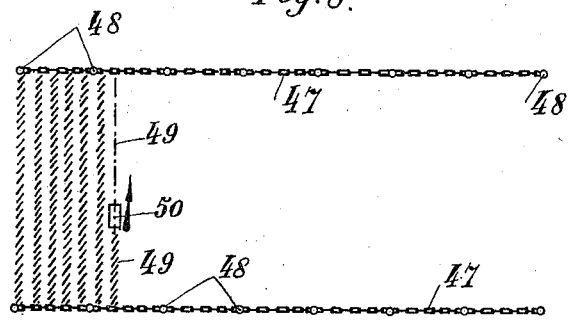
Fig. 8 shows the method of tilling the field.

In the Fig. 8 two chains 47 are fixed along two sides of the field by means of posts or pickets 48 which serve to hold the ends of the cable or cables 49 along which the Belgian or swing plow 50 is traversed by the winches.

Figure 9:
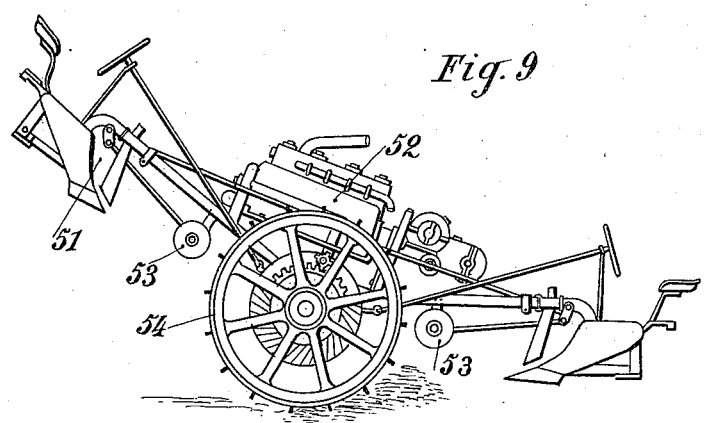
Fig. 9 is a modification.

In the modification shown in Fig. 9 a swing plow with one share 51 is provided with a motor 52; the motor can drive not only the winches 53 but also for light work on a great deal of suitable land the motor directly operates the driving wheels 54, the cables in this case being removed.

Having now particularly described and ascertained the nature of my said invention, and in what manner the said invention is to be performed, I declare that what I claim is:—

A plow including a source of power, a cable, means mounted upon a shaft and driven from said source of power, said means being adapted to engage the cable, and guide means for said cable mounted upon said shaft.

Dated this 11th day of January 1918.

In testimony whereof I affix my signature in presence of two witnesses.

ADOLPHE BLANCHARD.

Witnesses:
 JULES LEBSEUE,
 CHAS. P. PRESSLY.

Copies of this patent may be obtained for five cents each, by addressing the "Commissioner of Patents, Washington, D. C."